United States Patent
Lavigne et al.

(10) Patent No.: US 11,803,133 B2
(45) Date of Patent: Oct. 31, 2023

(54) PRINT REFILL DEVICES

(71) Applicant: HEWLETT-PACKARD DEVELOPMENT COMPANY, L.P., Spring, TX (US)

(72) Inventors: Mathew Lavigne, Boise, ID (US); Jeffrey H. Luke, Boise, ID (US); Matthew James Storey, Austin, TX (US); Jefferson Blake West, Austin, TX (US); Bennett Alexander Nadeau, Austin, TX (US); Zackary Thomas Hickman, Austin, TX (US); An Tran, Austin, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/051,046

(22) PCT Filed: Aug. 30, 2018

(86) PCT No.: PCT/US2018/048698
§ 371 (c)(1),
(2) Date: Oct. 27, 2020

(87) PCT Pub. No.: WO2020/046304
PCT Pub. Date: Mar. 5, 2020

(65) Prior Publication Data
US 2021/0229450 A1      Jul. 29, 2021

(51) Int. Cl.
*G03G 15/08*          (2006.01)
(52) U.S. Cl.
CPC ....... *G03G 15/087* (2013.01); *G03G 15/0886* (2013.01)

(58) Field of Classification Search
CPC ......... B41J 2/17506; G03G 2215/0673; G03G 15/0886
See application file for complete search history.

(56) References Cited

U.S. PATENT DOCUMENTS

| | | | |
|---|---|---|---|
| 4,065,335 A | 12/1977 | Pollack | |
| 4,304,273 A | 12/1981 | Caudill et al. | |
| 5,089,854 A | 2/1992 | Kaieda et al. | |
| 5,111,976 A | 5/1992 | Ban | |
| 5,345,297 A * | 9/1994 | Katakabe | G03G 15/0886 222/DIG. 1 |

(Continued)

FOREIGN PATENT DOCUMENTS

| | | |
|---|---|---|
| JP | 6098468 | 6/1985 |
| JP | 62121471 | 6/1987 |

(Continued)

OTHER PUBLICATIONS

Machine translation of JP3467650_Description (Year: 2003).*
Machine translation of JPS6098468_Description (Year: 1985).*

*Primary Examiner* — Arlene Heredia
(74) *Attorney, Agent, or Firm* — Foley & Lardner LLP (57) ABSTRACT

Examples described herein relate to a print particle refill device consistent with the disclosure. For instance, a print particle refill device may comprise a cap disk to form a barrier between the print particle refill device and a receptacle, a first liner adjacent to the cap disk to seal print particles in the print particle refill device, and an actuating liner to wipe print particles, when present, from the receptacle.

15 Claims, 5 Drawing Sheets

(56) References Cited

U.S. PATENT DOCUMENTS

| | | | |
|---|---|---|---|
| 5,548,384 A * | 8/1996 | Weed | G03G 15/0886 |
| | | | 222/DIG. 1 |
| 5,673,073 A | 9/1997 | Childers et al. | |
| 5,774,773 A | 6/1998 | Otsuka et al. | |
| 6,164,769 A | 12/2000 | Inada et al. | |
| 6,259,877 B1 | 7/2001 | Taniyama et al. | |
| 6,332,065 B1 | 12/2001 | Howard | |
| 6,862,420 B1 * | 3/2005 | Less | G03G 15/0884 |
| | | | 399/258 |
| 7,116,931 B2 | 10/2006 | Yamada et al. | |
| 7,174,120 B2 | 2/2007 | Koyama et al. | |
| 8,025,379 B2 | 9/2011 | Hattori et al. | |
| 8,808,955 B2 | 8/2014 | Nakayama et al. | |
| 11,364,725 B2 * | 6/2022 | Moon | B41J 2/17546 |
| 11,613,126 B2 * | 3/2023 | Storey | B41J 2/17523 |
| | | | 347/110 |
| 11,701,891 B2 * | 7/2023 | Ruiz Rivas | B41F 31/20 |
| | | | 347/85 |
| 2017/0368834 A1 | 12/2017 | Cameno Salinas et al. | |
| 2023/0017982 A1 * | 1/2023 | Chick | B41J 2/17596 |

FOREIGN PATENT DOCUMENTS

| | | |
|---|---|---|
| JP | 08-152775 A | 6/1996 |
| JP | 08-179611 A | 7/1996 |
| JP | 09-211954 A | 8/1997 |
| JP | 3467650 | 9/2003 |
| RU | 2571658 | 12/2015 |
| RU | 2599278 | 10/2016 |
| WO | WO2004033214 A1 | 4/2004 |

* cited by examiner

Figure 6

PRINT REFILL DEVICES

CROSS REFERENCE TO RELATED APPLICATIONS

This application is a U.S. National Stage Application which claims the benefit under 35 U.S.C. § 371 of International Patent Application No. PCT/US2018/048698 filed on Aug. 30, 2018, the contents of which are incorporated herein by reference.

BACKGROUND

Printing device such as printers, copiers, etc. may be used to form markings on a print medium, such as text, images, etc. Printing device may form markings on the print medium and/or form a three-dimensional object by employing a print substance such as an ink, toner, and/or a three-dimensional (3D) printing substance such as three-dimensional printing powders, etc.

DETAILED DESCRIPTION

Printing devices may form markings on a print medium (e.g., paper, photopolymers, plastics, composite, metal, wood, etc.) by transferring a print particle (e.g., ink, toner, 3D printing powder, etc.) from a reservoir to print medium. A print particle refill device may be used to refill a reservoir when the amount of print particles in the reservoir is not at capacity. That is, as the printing device draws the print particles from the reservoir, the amount of print particles in the reservoir may deplete. As a result, the amount of print particles in the reservoir of the printing device may have to be replenished.

However, print particle residue may remain on the surface of a receptacle or the print particle refill device after the transfer of print particles into the reservoir is complete. Print particle residue remaining on the surface of the receptacle or the print particle refill device may cause the print particle residue to transfer onto the user as well as other non-intended surfaces. In addition, print particle residue remaining on the surface of the print particle refill device and/or the receptacle may contaminate the print particles entering the reservoir.

As such, print refill devices, as described herein, may include a cap disk, a first liner, and an actuating to wipe print particles from a receptacle and limit the amount of print particle remaining on the surface of the receptacle after a refill process. Limiting the amount of print particle remaining on the receptacle may reduce the amount of contaminated print particle entering the reservoir. Accordingly, this disclosure describes print particle refill devices that wipe print particles remaining on the surface of a receptacle after a refill process thereby reducing the amount of contaminated print particles that enter the reservoir and reducing the amount of transferable print particles remaining after a refill process.

Figure 1:
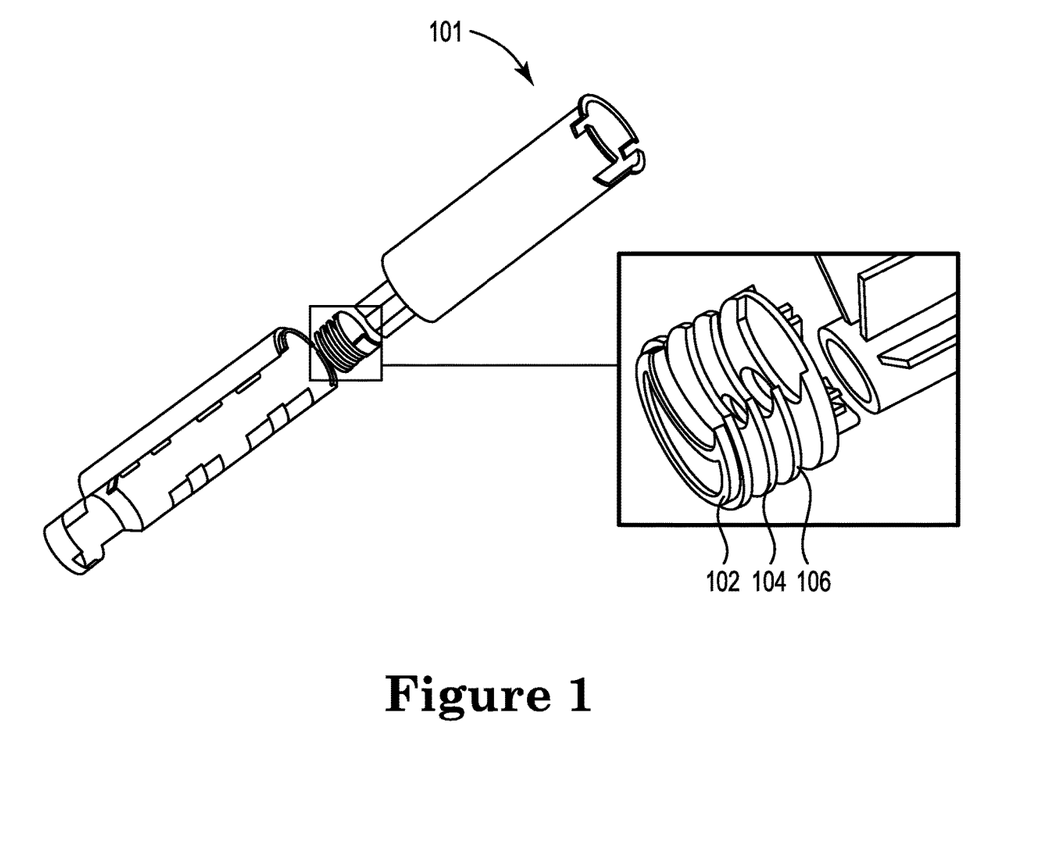
FIG. 1 illustrates an example of a print particle refill device consistent with the disclosure.

FIG. 1 illustrates an example of a print particle refill device 101 consistent with the disclosure. The print particle refill device 101 may be used with a variety of printing devices, such as printers, copiers, etc., for example. As used herein, "print particle refill device" refers to a device that communicates print particles into a receptacle. As used herein, "receptacle" refers to a device that communicates print particles into a reservoir. In some examples, the print particle refill device 101 may assist in the transfer of print particles into a reservoir. As used herein, "reservoir" refers to a vessel, box, carton, or other suitable repository for the containment of a print particles for use by the printing device. The print particle refill device 101 may come in contact with a receptacle to transfer print particles into a reservoir. For instance, print particles may travel through the print particle refill device 101 and through a receptacle to enter the reservoir. As used herein, "print particles" refers to a substance which, when applied to a medium, may form representation(s) on the medium during a print job. In some examples, the print particles may be deposited in successive layers to create three-dimensional (3D) objects. However, this disclosure is not so limited. In some examples, print particles may be deposited on a print medium such as paper to form representation(s).

In some examples, the print particle refill device 101 may have a syringe like structure including a plunger to move the print particles towards the receptacle and transfer print particles into a reservoir when the print particle refill device 101 is in an open position. As used herein, "syringe" refers to a reciprocating pump including a plunger and a tube, where the plunger may be linearly moved to allow the syringe to take in and/or expel liquid, powder, or gas through an orifice at the end of the tube. As used herein, "plunger" refers to a piston to take in and/or expel liquid, powder, or gas through an orifice at the end of a syringe.

In some examples, print particle refill device 101 may include a cap disk 102. The cap disk 102 may form a barrier between the print particle refill device 101 and a receptacle. That is, the cap disk 102 may prevent print particles from exiting the print particle refill device 101 when the print particle refill device 101 is in a closed position. In some examples, the cap disk 102 may be stationary. For instance, as the print particle refill device 101 transitions between an open position and a closed position the cap disk 102 may not move (e.g., rotate). As used herein, "open position" refers to a position of a syringe, print particle refill device, or receptacle that allows the communication of print particles into a reservoir. As used herein, "closed position" refers to a position of a syringe, print particle refill device, or receptacle that prevents the communication of print particles.

In some examples, the print particle refill device 101 may include a first liner 104. The first liner 104 may be adjacent to the cap disk 102. It should be understood that when an element is referred to as being "adjacent" to another element, it may be on, in contact, connected, next to, or coupled with the other element. In some examples, the first liner 104 may be coupled to the cap disk 102 and may remain stationary as the print particle refill device 101 transition between an open position and a closed position. It should be understood that when an element is referred to as being "in contact," "connected to", or "coupled to" another element, it may be directly in contact, connected, or coupled with the other element or intervening elements may be present. In contrast, when an object is "directly in contact with" another element it is understood that are no intervening elements etc.

In some examples, the first liner 104 may ensure that the print particles are sealed inside the print particle refill device 101. That is, when the print particle refill device 101 is in a closed position the first liner 104 may seal the print particles inside the print particle refill device 101. In addition, in some examples, the first liner 104 may assist in cleaning the print particles from the print particle refill device 101 and the receptacle. For instance, as the print particle refill device 101 transitions between an open position and a closed position the first liner 104 may trap and/or absorb print particles remaining on the surface of the receptacle and the print particle refill device 101. As used herein, "absorb" refers to the act of taking in a substance and or soaking up a substance.

In some examples, the print particle refill device 101 may include an actuating liner 106 adjacent to the first liner 104. The actuating liner 106 may wipe away print particles from the exposed features of the receptacle. For example, after a refill process the actuating liner 106 may wipe print particles from the opening of the receptacle. The actuating liner 106 may wipe the receptacle removing residual print particles from the opening of the receptacle after the refill process is completed. As used herein, "refill process" refers to the act of adding print particles to the reservoir. The actuating liner 106 may limit the amount of print particles that are present on the receptacle after the transfer of print particles. That is, the actuating liner 106 may wipe excess print particles from the receptacle after the transfer of print particles to limit the amount of print particles present in the opening (e.g., opening 326 of FIG. 3) of the receptacle after the transfer of print particles. As used herein, "wipe" refers to the act of cleaning by rubbing.

Figure 2:
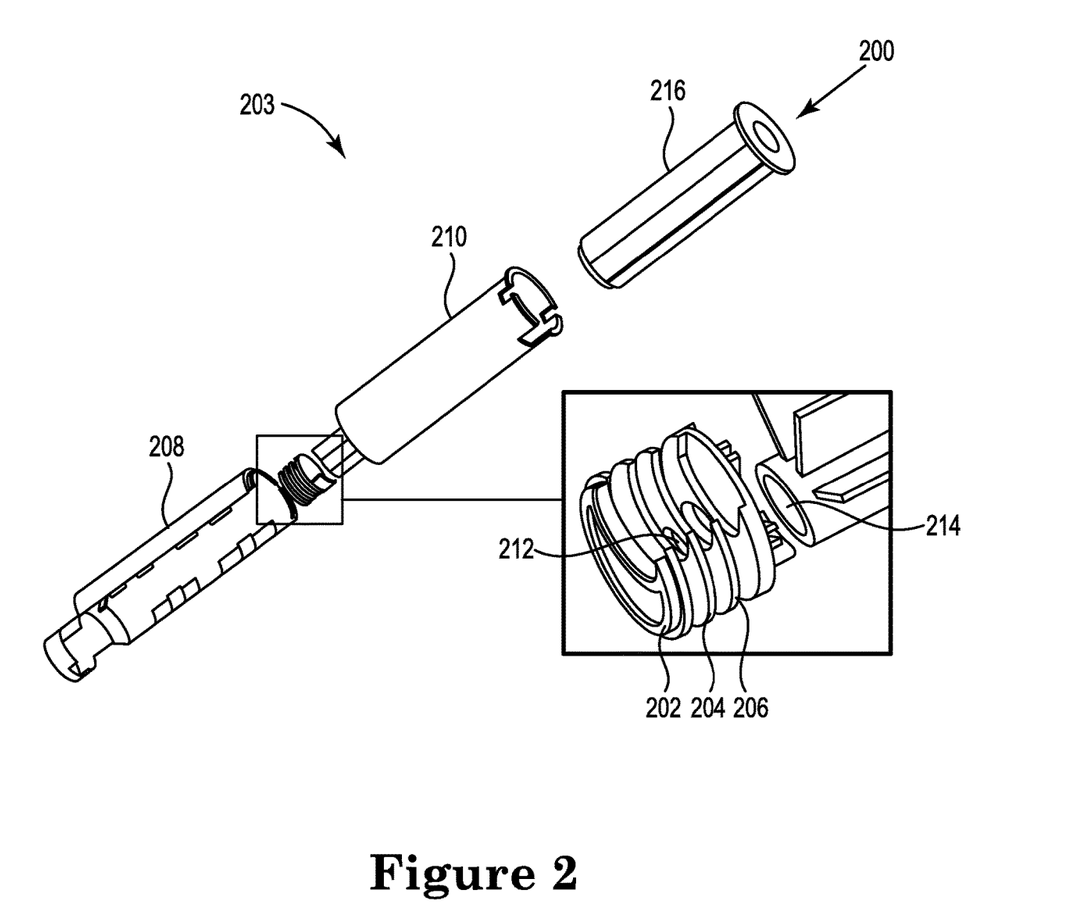
FIG. 2 illustrates an example of an apparatus consistent with the disclosure.

FIG. 2 illustrates an example of an apparatus 203 consistent with the disclosure, Cap disk 202 is analogous or similar to cap disk 102 of FIG. 1. First liner 204 is analogous or similar to first liner 104 of FIG. 1. Actuating liner 206 is analogous or similar to actuating liner 106 of FIG. 1.

In some examples, the apparatus 202 may include a syringe 200. The syringe 200 may include a body 210 to store print particle. The body 210 may store print particles of varying types and forms. For example, the body 210 may store print particles made of a powdered semi-crystalline thermoplastic material, a powdered metal material, a powdered plastic material, a powdered composite material, a powdered ceramic material, a powdered glass material, a powdered resin material, and/or a powdered polymer material, among other types of powdered or particulate material. The print particles may be particles with an average diameter of less than one hundred microns. For example, the print particles may be particles with an average diameter of between 0-100 microns. However, examples of the disclosure are not so limited. For example, print particles may be particles with an average diameter of between 20-50 microns, 5-10 microns, or any other range between 0-100 microns.

In some examples, print particles may travel from the body 210 of the syringe 200 into a reservoir to replenish the amount print particles in the reservoir. In some examples, the body 210 may include a plunger 216 that causes the print particles stored in the body 210 to travel from the body 210 into a reservoir. That is, the plunger 216 may be pushed to cause print particles to move towards the receptacle and/or reservoir. In some examples, the plunger 216 may cause the body 210, the cap disk 202, the first liner 204, and the actuating liner 206 to transition towards the receptacle.

In some examples, the body 210 may be disposed inside of an outer syringe body 208. As used herein, "outer syringe body" refers to an outer structure of a syringe. The outer syringe body 208 may contact the receptacle during a refill process. For instance, portions of the outer syringe body 208 may enter a receptacle to initiate a refill process. In addition, the outer syringe body 208 may house the actuating liner 206. In some examples, the body 210 may include an aperture 214 to communicate print particles through syringe 200. The aperture 214 may allow print particles to travel through the actuating liner 206 disposed in the outer syringe body 208 to communicate print particles to a reservoir.

That is, the actuating liner 206 may be disposed inside of the outer syringe body 210. In addition, the actuating liner 206 may wipe the surface of the receptacle and the outer syringe body 208 as syringe 200 transitions into an open position. Similarly, the actuating liner 206 may wipe residual print particles from the surface of the receptacle and the outer syringe body 208 after a refill process is complete. For instance, after the refill process is completed the actuating liner 206 may wipe the opening of the receptacle and the inner surface of the outer syringe body 208 limiting the amount of residual print particles. In some examples, the actuating liner 206 may include a liner aperture 212 to communicate print particles through a syringe 200. The liner aperture 212 may allow print particles to travel from an aperture 214 of the body 210 through the liner aperture 212 disposed in the outer syringe body 208 when the aperture 214 and the liner aperture 212 are aligned.

In some examples, the outer syringe body 208 may house a first liner 204. That is, the first liner 204 may be disposed inside of the outer syringe body 210. The first liner 204 may absorb print particles remaining on the inner surface of the outer syringe body 208 after the refill process. For instance, after the refill process is completed the actuating liner 206 may wipe the inner surface of the outer syringe body 208 allowing the first liner 204 to absorb the remaining print particles thereby limiting the amount of residual print particles on the inner surface of the outer syringe body 208.

In some examples, the outer syringe body 208 may house a cap disk 202. That is, the cap disk 202 may be disposed inside of the outer syringe body 210. In some examples, the cap disk 202 may from a barrier for the syringe 200. As the syringe 200 enters the receptacle the cap disk 202 may come in contact with the receptacle to prevent print particles from exiting the syringe 200 when the syringe 200 is in a closed position.

Figure 3:
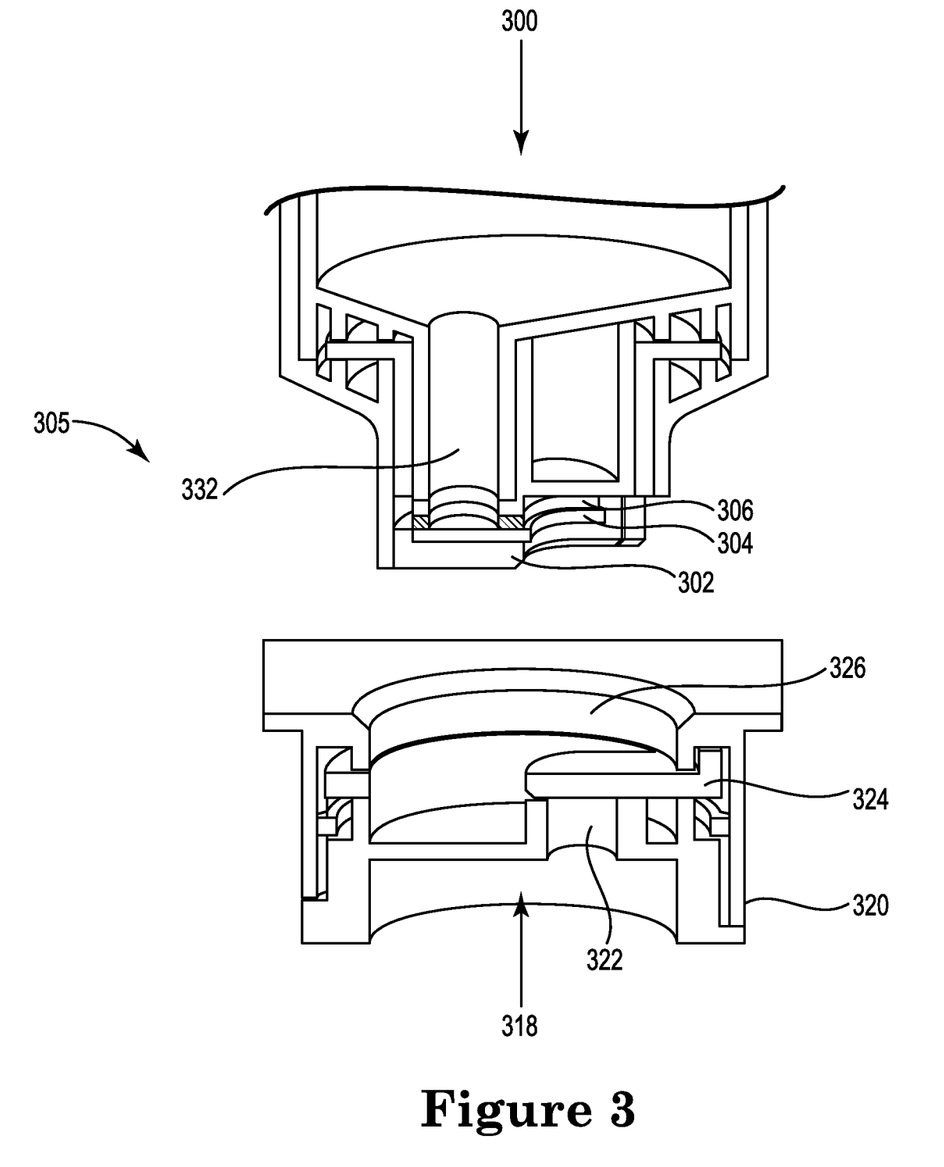
FIG. 3 illustrates an example of a cross section view of a system consistent with the disclosure.

FIG. 3 illustrates an example of a cross section view of a system 305 consistent with the disclosure. Cap disk 302 is analogous or similar to cap disk 102 and 202 of FIGS. 1 and 2, respectively. First liner 304 is analogous or similar to first liner 104 and 104 of FIGS. 1 and 2, respectively. Actuating liner 306 is analogous or similar to actuating liner 106 and 206 of FIGS. 1 and 2, respectively.

In some examples, the system 305 may include a syringe 300. The syringe 300 may include a body (e.g., body 210 of FIG. 2) to store print particles and supply print particles to the reservoir by transitioning the print particles through a receptacle 318. In some examples, the syringe 300 may include a cap disk 302 to prevent print particles from exiting the syringe 300 when the syringe 300 is in a closed position. That is, the cap disk 302 may serve as a barrier between the syringe 300 and the receptacle 318. In some examples, the cap disk 302 may ensure that the user does not come in contact with the first liner 304 and the actuating liner 306.

In some examples, the first liner 304 and the actuating liner 306 may contain residual print particles from a completed refill process. That is, the cap disk 302 may cover the first liner 304 and the actuating liner 306 while the syringe 300 is in a closed position. However, the syringe 300 may not transition into an open position until it is inserted into the receptacle 318 and rotated thereby limiting the amount of print particles that come in contact with the user and other surfaces.

In some examples, the syringe 300 may include an actuating liner 306 to wipe the receptacle exit 322 after a refill process is complete, For example, the actuating liner 306 may come in direct contact with the receptacle exit 322 when the system 305 is in an open position thereby allowing the actuating liner 306 to wipe the surfaces of the receptacle exit 322 when the system 305 transitions into a closed position. In some examples, the actuating liner 306 wiping excess print particles from the surface of the receptacle 318 may limit the amount of print particles remaining on the surface of the receptacle 318 and syringe 300. For instance, the actuating liner 306 wiping excess print particles from the surface of the receptacle 318 may allow the first liner 304 to absorb residual print particles from the syringe 300. That is, the first liner 304 and the actuating liner 306 may work together as the syringe 300 transitions between an open position and a closed position to clean and wipe the system 305. Reducing the amount of residual print particles on the system 305 after a refill process may limit the amount of print particles that may transfer onto the user as well as other non-intended surfaces.

In some examples, the actuating liner 306 may be comprised of a densely compacted fabric to wipe the receptacle exit 322 as the system 305 transitions between an open position and a closed position. For example, the actuating liner 306 may be comprised of cloth, felt, a variety of different textiles, or a combination thereof. However, this disclosure is not so limited. In some examples, the actuating liner 306 may be comprised of a foam material to wipe the receptacle exit 322 as the system 305 transitions between an open position and a closed position. In some examples, it may be difficult to clean and/or wipe the syringe 300 with other materials such as plastic, rubber, etc. In some examples, the actuating liner 306 may be a thin material with a thickness ranging from about 1.0 millimeters (mm) to about 2.0 mm along with any individual values and/or sub-ranges between about 1.0 mm and about 2.0 mm.

In some examples, the first liner 304 may be comprised of a densely compacted fabric to absorb print particles from the syringe 300 as the system 305 transitions between an open position and a closed position. For example, the first liner 304 may be comprised of cloth, felt, a variety of different textiles, or a combination thereof. However, this disclosure is not so limited. In some examples, the first liner 304 may be comprised of a foam material to clean the syringe 300 as the system 305 transitions between an open position and a closed position. In some examples, it may be difficult to absorb print particles from the syringe 300 with other materials such as plastic, rubber, etc. In some examples, the first liner 304 may be a thin material with a thickness ranging from about 1.0 mm to about 2.0 mm along with any individual values and/or sub-ranges between about 1.0 mm and about 2.0 mm.

For instance, when the syringe 300 is in an open position the aperture (e.g., aperture 214 of FIG. 2) and the liner aperture (e.g., liner aperture 212 of FIG. 2) may be substantially aligned with the receptacle exit 322 with no intervening barrier. The aperture and the liner aperture may create a print particle exit 332 in the syringe 300. As used herein, "print particle exit" refers to the pathway created by the aperture and the liner aperture being substantially aligned. In contrast, when the syringe 300 is in a closed position the aperture and the liner aperture may be substantially offset with the receptacle exit 322. As used herein, the term substantially intends that the characteristic does not have to be absolute but is close enough so as to achieve the characteristic. For example, "substantially aligned" is not limited to absolutely aligned. For example, "substantially offset" is not limited to absolutely offset.

In some examples, the syringe 300 may enter a receptacle 318 to transfer print particles into a reservoir. In some examples, the syringe 300 may enter the receptacle 318 if the syringe 300 is in a closed position. That is, if the syringe 300 is in an open position (e.g., the aperture and the liner aperture are substantially aligned with the receptacle exit) the syringe 300 cannot enter the receptacle 318. In various examples, the syringe 300 may not transition into an open position unless it has entered the receptacle 318 and has been authenticated.

In some examples, the receptacle 318 may include a receptacle body 320 having an opening 326 to receive a syringe 300. In addition, the receptacle 318 may include a receptacle exit 322 disposed in the receptacle body 320. The receptacle exit 322 may allow print particles to enter a reservoir. That is, after the syringe 300 enters the receptacle 318 and transitions into an open position, print particles may travel from the syringe 300 through receptacle 318 into the reservoir. In some examples, when the system 305 is in an open position the print particle exit 332 may be substantially aligned with the receptacle exit 322 allowing the print particles to travel through the receptacle exit 322. As used herein, "receptacle exit" refers to an opening of the receptacle through which material (e.g., print particles) may be moved.

In some examples, the receptacle 318 may include a receptacle cover 324. The receptacle cover 324 may block the receptacle exit when the system is in the closed position preventing print particles from exiting the syringe 300 when the system 305 is in a closed position, That is, the receptacle cover 324 may be adjacent to the receptacle exit 322 when the system 305 is in a closed position. For instance, when the system 305 is in a closed position the receptacle cover 324 may be substantially aligned with the receptacle exit 322. In contrast, when the system 305 is in an open position the receptacle cover 324 may be substantially offset with the receptacle exit 322.

Figure 4:
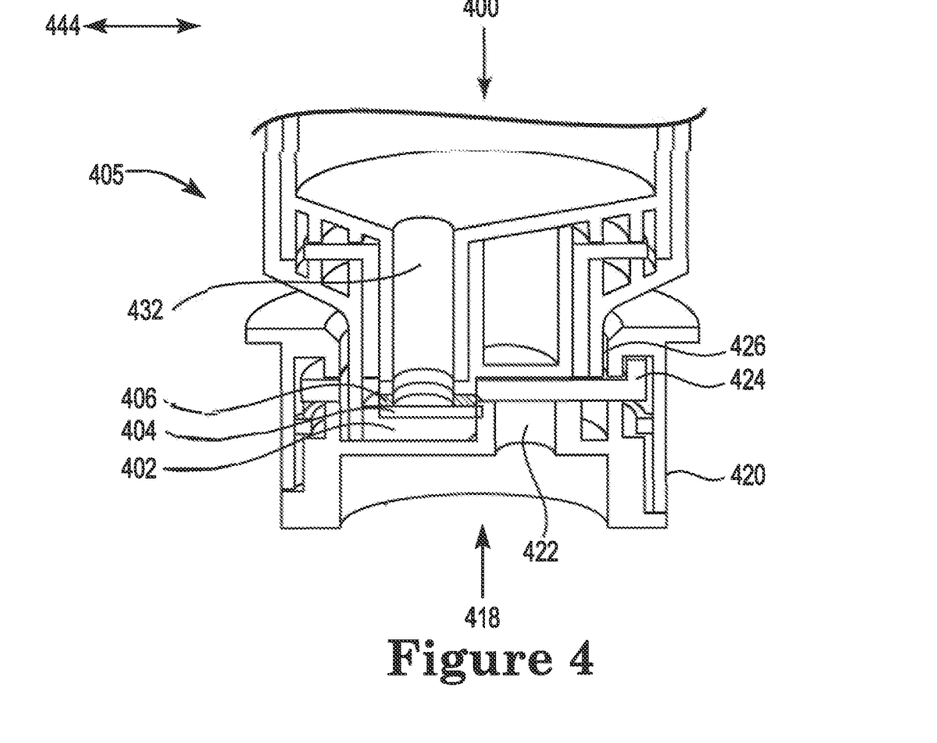
FIG. 4 illustrates an example of a cross section view of a system in a closed position consistent with the disclosure.

FIG. 4 illustrates an example of a cross section view of a system 405 in a closed position consistent with the disclosure. Cap disk 402 is analogous or similar to cap disk 102, 202, and 302 of FIGS. 1, 2, and 3, respectively. First liner 404 is analogous or similar to first liner 104, 204, and 304 of FIGS. 1, 2, and 3, respectively. Actuating liner 406 is analogous or similar to actuating liner 106, 206, and 306 of FIGS. 1, 2, and 3, respectively. Print particle exit 432 is analogous or similar to print particle exit 332 of FIG. 3. Actuating liner 406 is analogous or similar to actuating liner 106, 206, and 306 of FIGS. 1, 2, and 3, respectively. Receptacle cover 424 is analogous or similar to receptacle cover 324 of FIG. 3. Receptacle exit 422 is analogous or similar to receptacle exit 322 of FIG. 3. Receptacle 418 is analogous or similar to receptacle 318 of FIG. 3. Opening 426 is analogous or similar to opening 326 of FIG. 3. System 405 is analogous or similar to system 305 of FIG. 3.

In some examples, the system 405 may include a syringe 400 and a receptacle 418. System 405 of FIG. 4 illustrates the system 405 in a closed position. The system 405 may be in a closed position when the print particle exit 432 and the receptacle exit 422 are substantially offset and the receptacle cover 424 is substantially aligned with the receptacle exit 422. Likewise, the system 405 may be in a closed position when the syringe 400 and the receptacle 418 are in a closed position. The syringe 400 may be in a closed position when the print particle exit 432 is substantially aligned with the first liner 404. The receptacle 418 may be in a closed position when the receptacle cover 424 is substantially aligned with the receptacle exit 422.

In some examples, the syringe 400 may enter the receptacle 418 in a closed position. That is, the syringe 400 may be in a closed position when it enters the opening (e.g., opening 326 of FIG. 3) of the receptacle 418. In addition, the receptacle 418 may be in a closed position when the syringe 400 enters the opening of the receptacle 418. In some examples, the system 405 may transition into a closed position by rotating the syringe 400 in a direction as denoted by arrow 444, That is, after the transfer of print particles into the reservoir is complete the syringe 400 may rotate to return the system 405 to a closed position. For instance, the system 405 may transition into a position where the print particle exit 432 is substantially aligned with the first liner 404. In other words, the system 405 may transition into a position where the actuating liner 406 and the body (e.g., body 210 of FIG. 2) are substantially aligned with the first liner 404. In addition, the system 405 may transition into a position where the print particle exit 432 and the receptacle exit 422 are substantially offset and the receptacle cover 424 is substantially aligned with the receptacle exit 422.

Figure 5:
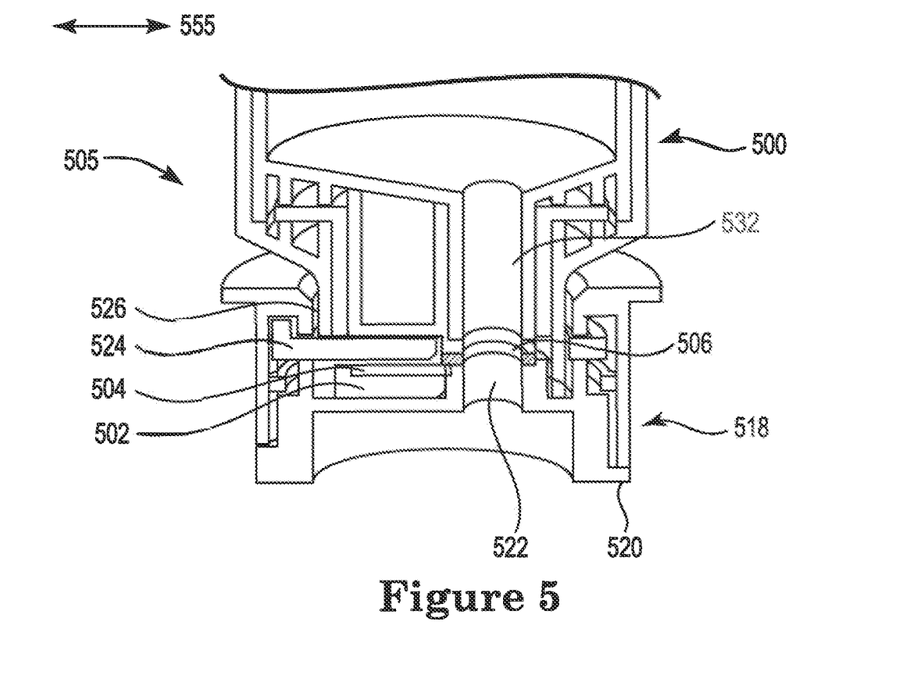
FIG. 5 illustrates an example of a cross section view of a system in an open position consistent with the disclosure.

FIG. 5 illustrates an example of a cross section view of a system 505 in an open position consistent with the disclosure. Cap disk 502 is analogous or similar to cap disk 102, 202, 302, and 402 of FIGS. 1, 2, 3, and 4, respectively. First liner 504 is analogous or similar to first liner 104, 204, 304, and 404 of FIGS. 1, 2, 3, and 4, respectively. Actuating liner 506 is analogous or similar to actuating liner 106, 206, 306, and 406 of FIGS. 1, 2, 3, and 4, respectively. Print particle exit 532 is analogous or similar to print particle exit 332 and 432 of FIGS. 3 and 4, respectively. Actuating liner 506 is analogous or similar to actuating liner 106, 206, 306, and 406 of FIGS. 1, 2, 3, and 4, respectively. Receptacle cover 524 is analogous or similar to receptacle cover 324 and 432 of FIGS. 3 and 4, respectively. Receptacle exit 522 is analogous or similar to receptacle exit 322 and 422 of FIGS. 3 and 4, respectively, Receptacle 518 is analogous or similar to receptacle 318 and 418 of FIGS. 3 and 4, respectively. Opening 526 is analogous or similar to opening 326 and 426 of FIGS. 3 and 4, respectively. System 505 is analogous or similar to system 305 and 405 of FIGS. 3 and 4, respectively.

In some examples, the system 505 may include a syringe 500 and a receptacle 518. System 505 of FIG. 5 illustrates the system 505 in an open position. The system 505 may be in an open position when the print particle exit 532 and the receptacle exit 522 are substantially aligned and the receptacle cover 524 is substantially offset with the receptacle exit 522. Likewise, the system 505 may be in an open position when the syringe 500 and the receptacle 518 are in an open position. In some examples, the receptacle 518 may not transition into an open position if the syringe 500 does not transition in to an open position. In some examples, the syringe 500 may be in an open position when the print particle exit 532 is substantially offset with the first liner 504, For instance, the syringe 500 may rotate and cause the print particle exit 532 to be substantially aligned with the receptacle exit 522. In other words, the liner aperture (e.g., liner aperture 212 of FIG. 2) of the actuating liner 506 and the aperture (e.g., aperture 214 of FIG. 2) of the body (e.g., body 210 of FIG. 2) may align with the receptacle exit 522.

That is, the actuating liner 506 and the body may rotate in a direction as denoted by arrow 555 to transition the system 505 into an open position. In some examples, the first liner 504 and the cap disk 502 may remain fixed as the actuating liner 506 and the body rotate. In addition, the receptacle 518 may be in an open position when the receptacle cover 524 is substantially offset with the receptacle exit 522. That is, as the actuating liner 506 and the body rotates to become substantially aligned with the receptacle exit 524, the receptacle cover 524 may actuate to becomes substantially offset with the receptacle exit 522.

Figure 6:
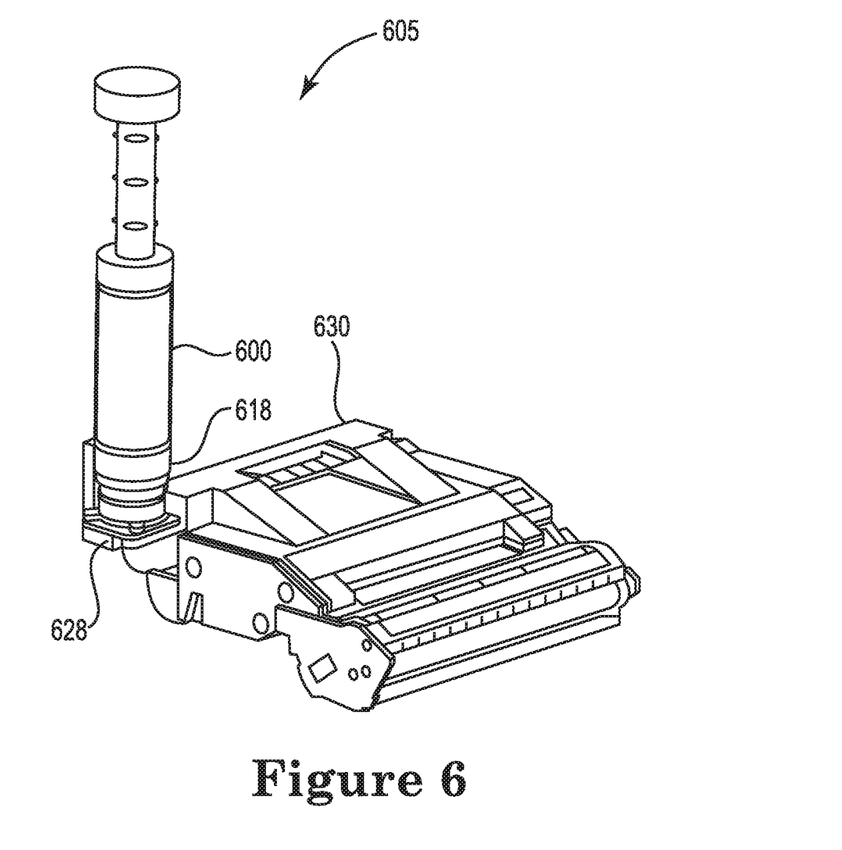
FIG. 6 illustrates an example of a system including a syringe consistent with the disclosure.

FIG. 6 illustrates an example of a system 605 including a syringe 600 consistent with the disclosure. Syringe 600 is analogous or similar to syringe 200, 300, 400, and 500 of FIGS. 2, 3, 4, and 5, respectively. Receptacle 618 is analogous or similar to receptacle 318, 418, and 518 of FIGS. 3, 4, and 5, respectively. System 605 is analogous or similar to system 305, 405 and 505 of FIGS. 3, 4, and 5, respectively.

In some examples, the syringe 600 may house print particles to refill a reservoir 628. In some examples, the reservoir 628 may be removable inserted into a printing device 630. In some examples, the reservoir 628 may be coupled to a receptacle 618. The receptacle 618 may be accessible through the exterior of the printing device 630.

In the foregoing detailed description of the disclosure, reference is made to the accompanying drawings that form a part hereof, and in which is shown by way of illustration how examples of the disclosure may be practiced. These examples are described in sufficient detail to enable the disclosed examples, and it is to be understood that other examples may be utilized and that process, electrical, and/or structural changes may be made without departing from the scope of the disclosure. Further, as used herein, "a" may refer to one such thing or more than one such thing.

The figures herein follow a numbering convention in which the first digit corresponds to the drawing figure number and the remaining digits identify an element or component in the drawing. Elements shown in the various figures herein may be capable of being added, exchanged, and/or eliminated so as to provide a number of additional examples of the disclosure. In addition, the proportion and the relative scale of the elements provided in the figures are intended to illustrate the examples of the disclosure and should not be taken in a limiting sense. It should be understood that the descriptions of various examples may not be drawn to scale and thus, the descriptions may have a different size and/or configuration other than as shown therein.

What is claimed:

1. A print particle refill device comprising:
a cap disk, inside of the print particle refill device, to form a barrier between the print particle refill device and a receptacle, and to resist rotation in response to rotation of the print particle refill device with respect to the receptacle;
a first liner, inside of the print particle refill device and adjacent to the cap disk and coupled to the cap disk, to seal print particles in the print particle refill device, and to resist rotation in response to the rotation; and
an actuating liner, inside of the print particle refill device and adjacent to the first liner, to wipe print particles, present at the receptacle from the receptacle, and to rotate in response to the rotation, wherein the first liner is between the cap disk and the actuating liner and the actuating liner contacts with the receptacle when the cap disk and the first liner are in an open position.

2. The print particle refill device of claim 1, wherein the actuating liner is to wipe print particles, present at the receptacle from an opening of the receptacle when the print particle refill device transitions into a closed position.

3. The print particle refill device of claim 2, wherein the first liner is coupled to the cap disk and is stationary as the print particle refill device rotates between an open position and the closed position.

4. The print particle refill device of claim 1, wherein the actuating liner is adjacent to the first liner.

5. The print particle refill device of claim 1, wherein print particle refill device is a syringe including a plunger to move the print particles towards the receptacle.

6. An apparatus comprising:
a syringe including:
a cap disk to form a barrier between the syringe and a receptacle, and to resist rotation in response to rotation of a print particle refill device with respect to the receptacle;
an outer syringe body to contact the receptacle during a refill process;
a first liner, disposed inside of the outer syringe body and coupled to the cap disk, to absorb print particles present in the syringe after the refill process, and to resist rotation in response to the rotation;
an actuating liner disposed inside of the outer syringe body and adjacent to the first liner to wipe print particles present at the receptacle from the receptacle after the refill process; process, and to rotate in response to the rotation;
a body disposed inside of the outer syringe body to house print particles; and
a plunger to move the print particles towards the receptacle, wherein the cap disk, the first liner, and the actuating liner are inside of the outer syringe body,
wherein the first liner is between the cap disk and the actuating liner and the actuating liner contacts with the receptacle when the cap disk and the first liner are in an open position.

7. The apparatus of claim 6, wherein the plunger is to transition towards the receptacle when the syringe is in an open position.

8. The apparatus of claim 6, further comprising the receptacle including:
a receptacle body including an opening to receive the syringe;
a print particle exit disposed in the receptacle body; and
a receptacle cover to block the print particle exit when the syringe is in a closed position.

9. The apparatus of claim 8, wherein the receptacle is coupled to a reservoir.

10. A system comprising:
a syringe including:
a cap disk to form a barrier between the syringe and a receptacle, and to resist rotation in response to rotation of a print particle refill device with respect to the receptacle;
a first liner, adjacent to the cap disk and coupled to the cap disk, to absorb print particles present in the syringe after a refill process, and to resist rotation in response to the rotation; and
an actuating liner adjacent to the first liner to wipe print particles present at the receptacle from the receptacle responsive to the transition of the system between a closed position and an open position, and to rotate in response to the rotation; and
the receptacle including;
a receptacle body including an opening to receive the syringe;
a receptacle exit disposed in the receptacle body; and
a receptacle cover to block the receptacle exit when the system is in the closed position, wherein the cap disk, the first liner, and the actuating liner are inside of the syringe,
wherein the first liner is between the cap disk and the actuating liner and the actuating liner contacts with the receptacle when the cap disk and the first liner are in an open position.

11. The system of claim 10, wherein the system is to transition between the open position and the closed position by rotating the syringe after the syringe enters the opening of the receptacle body.

12. The system of claim 10, wherein the syringe further includes a plunger to cause the cap disk, the first liner, and the actuating liner to transition towards the receptacle.

13. The system of claim 10, wherein the actuating liner includes a liner aperture to communicate print particles into the receptacle.

14. The system of claim 13, wherein the liner aperture of the actuating liner is substantially aligned with the receptacle exit disposed in the receptacle body when the system is in the open position.

15. The system of claim 14, wherein the liner aperture of the actuating liner is substantially offset with the receptacle exit disposed in the receptacle body when the system is in the closed position.

* * * * *